United States Patent [19]

Gatchalian

[11] Patent Number: 5,412,812
[45] Date of Patent: May 9, 1995

[54] DETACHABLE EYESHIELD ATTACHMENT FOR VISOR CAPS OR THE LIKE

[76] Inventor: Bayani V. Gatchalian, 1609 Dawnbreak Ct., St. Charles, Mo. 63303-5011

[21] Appl. No.: 156,317

[22] Filed: Nov. 23, 1993

[51] Int. Cl.⁶ .................................................. A42B 1/06
[52] U.S. Cl. ........................................ 2/10; 2/209.13; 351/155
[58] Field of Search ................ 2/6.3, 6.5, 6.7, 10, 2/12, 13, 175.1, 195.1, 209.13; 16/319, 331, 335, 336; 24/514, 525, 563; 351/155; 411/174, 175

[56] References Cited

U.S. PATENT DOCUMENTS

| | | |
|---|---|---|
| 862,795 | 8/1907 | Blackiston . |
| 1,228,341 | 5/1917 | Maynard ........................ 2/10 |
| 1,334,878 | 3/1920 | Young . |
| 1,502,820 | 7/1924 | Funk . |
| 1,833,741 | 11/1931 | Diehl . |
| 2,445,203 | 7/1948 | Bowers . |
| 2,481,960 | 9/1949 | Wall et al. .................... 2/10 |
| 2,519,959 | 8/1950 | Fisher . |
| 2,538,607 | 1/1951 | Vaca . |
| 2,538,608 | 1/1951 | Vaca . |
| 2,619,641 | 12/1952 | Vaca .......................... 2/10 |
| 2,691,164 | 10/1954 | Feldman . |
| 2,691,165 | 10/1954 | Kane . |
| 2,717,385 | 9/1955 | Linster . |
| 4,152,051 | 5/1979 | Van Tiem et al. ............ 351/155 |
| 4,464,797 | 8/1984 | Glassman ................... 2/199 |
| 4,541,125 | 9/1985 | Phillips ...................... 2/10 |
| 4,616,367 | 10/1986 | Jean, Jr. et al. ............. 2/452 |
| 4,819,274 | 4/1989 | Day ........................... 2/10 |
| 4,885,808 | 12/1989 | Carpenter . |

Primary Examiner—Clifford D. Crowder
Assistant Examiner—Diana L. Biefeld

[57] ABSTRACT

The present invention relates to a detachable eyeshield attachment (10) For visor caps or the like comprising a clip-type mounting base (12) removably attached at the underside rear portion of a cap visor (15) or hat brim, a pivotable eyeshield holder (13) with an eyeshield (28) fixedly secured thereto, being hingedly clipped by the base (12) such that the holder (13) is capable of being controllably gripped or locked in place by the action of an adjustable actuating means (14) for flexedly tightening or loosening both arms (16) and (17) of the base.

4 Claims, 4 Drawing Sheets

DETACHABLE EYESHIELD ATTACHMENT FOR VISOR CAPS OR THE LIKE

BACKGROUND—FIELD OF INVENTION

The present invention relates to a detachable eyeshield attachment for visor caps or the like.

BACKGROUND—DESCRIPTION OF PRIOR ART

Headgears, especially visor caps, have been provided with eyeshield or eyeglasses mainly for ewe protection purposes against environmental adversities that are harmfull to the user's eyes, most especially in various types of sporting and working activities with such users as baseball players, hunters, golf players, boaters skiers, mill and construction workers, etc.

Quite a number of U.S. patents had been issued already to cover different types of devices of such types disclosed herein. Most of these devices are found to be generally complexed and comprised of many component parts, thus thaw cannot be considered ergonomic as in respect to the facility of use thereof is concerned. The following devices are illustrative.

U.S. Pat. No. 4,885,808 issued to Carpenter (1989) discloses an eyeshield for headgear that has its essential elements structurally interrelated in a relatively complex manner with the presence or provision of spring means. Being spring-actuated and characterized by a mechanical structure, this device cannot be considered a simple attached accessory which could be readily handled, repaired and adjusted according to one's preferences in such an easy way as handling one's visor cap or hat.

U. S. Pat. No. 2,538,608 issued to Vaca (1951) discloses a spring actuated eyeglasses attachment that has a similar complexity as the aforementioned patent.

U.S. Pat. No. 862,795 issued to Blackiston (1907) discloses an eyeglass attachment for caps and hats that consist of several metal parts and springs which are structured in a similar complex manner as those aforementioned. The presence of certain parts thereof being permanently attached to the cap visor incurs some disadvantage to its adaptability to a wide range of cap or hat types.

U.S. Pat. No. 4,819,274 issued to Day (1989) discloses a relatively simpler detachable eyeshield attachment, but it appears to be adaptable only to visor caps having the groove provision it teaches. The attachment of the mounting block thereof to the visor is prone to damage due to the fabric material usually used for caps or hats of the type herein disclosed, A further observation of the prior art so considered in the prior art search reveals that none of the prior patents adapt a simple temporary and/or adjustable locking action for the eyeshield holder at any desired position or inclination of the eyeshield.

SUMMARY OF THE INVENTION

The present invention seeks to overcome the drawbacks and disadvantages of the prior art by providing a detachable eyeshield attachment for visor caps or the like that has a very simple construction and comprises minimal component parts, and yet effectively achieves its intended objects and functions in the most facile and ergonomic way. This invention comprises only of a clip-type mounting base removably attached to the underside of the visor and a pivotable eyeshield holder mounted to the base, an actuating means effecting a tightening or loosening up of the holder. These simple basic elements coact structurally in a most simplified manner that anyone with or without any skill can easily use, adjust, modify or repair same without the need of expertise but just the use of one's common sense. Its simplicity and ergonimity of design and construction do not rule out the suitability thereof to children and/or youngsters who are on equal footing as far as the necessity of using this device is concerned.

It is therefore the main object of this invention to provide a detachable eyeshield attachment for visor caps or the like that is very much simple and ergonomic in its design and construction, and attains the facility of use desired of such a device that even children and/or youngsters do not have any difficulty handling or using same.

Another object thereof is to provide a detachable eyeshield attachment for visor caps or the like that is capable of effecting a tightening or loosening and temporary locking action of the eyeshield holder at any desired position or inclination of the eyeshield, either in the operative or inoperative position thereof.

Still another object thereof is to provide an eyeshield attachment that has a high degree of adjustability and adaptability with the least strain and/or unwanted modification or alteration on visor and eyeshield.

Yet another object thereof is to provide an eyeshield attachment that can be easily installed and removed to and from the cap visor or hat brim that it does not need any sort of skill or tools to do such.

A further object thereof is to provide an eyeshield attachment for visor caps or the like that is most economical and highly marketable in respect to its production or manufacturing and vendability aspects considering the simplicity of its design and construction and facility of use.

The above and further objects, features and advantages of the present invention will become apparent and be appreciated from the following detailed description, when read in conjunction with the appended drawing, wherein:

DRAWING FIGURES

FIG. 1 is a perspective view of the present invention as worn by a user;

FIG. 2 is an enlarged, perspective view thereof with the visor cap and eyeshield shown fragmentarily in phantom;

FIG. 3 is a cross-sectional view thereof taken along line A—A' of FIG. 2;

FIG. 4 is an exploded view thereof in a reversed position;

FIG. 5 is an alternative embodiment thereof showing another way of attaching the mounting base to the visor's underside surface, a different form of clipping arms and actuating means.

| REFERENCE NUMERALS IN DRAWINGS |
| --- |
| 10 eyeshield attachment |
| 11 visor cap |
| 12 clip-type mounting base |
| 13 pivotable eyeshield holder |
| 14 adjustable actuating means |
| 15 cap visor |
| 16 upper clipping arm |
| 17 lower clipping arm |
| 18 space gap |

-continued

REFERENCE NUMERALS IN DRAWINGS 19 transverse groove
20 split-sided knuckle
21 angular notch
22 shoulder
23 telescopically disposed aperture
24 hexagonal-shaped counterbore
25 pin-like rear end portion
26 planar main body
27 narrow channel
28 eyeshield
29 holding fastener
30 longitudinal slot
31 bolt
32 hole
33 wing nut
34 knurled top surface
35 hoop and loop fastening tape
23A opening
24A counterbored recess

DESCRIPTION OF DRAWINGS

Referring now to the drawings wherein like reference numerals designate the same parts all throughout the description, there is shown FIGS. 1 and 2 a detachable eyeshield attachment 10 for visor caps or the like 11, comprising basically a clip-type mounting base 12, a pivotable eyeshield holder 13 and an adjustable actuating means 14 for flexedly tightening or loosening of the grip of the mounting base over the holder.

The preferred embodiment shown in FIG. 1 is for illustrative purpose only.

Figure 3:
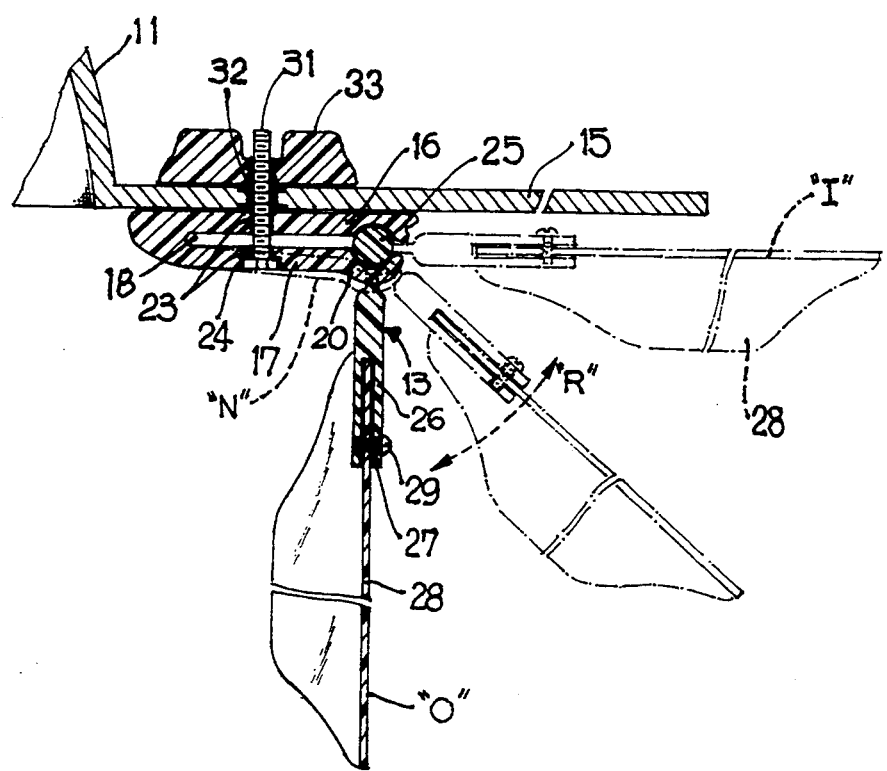
Figure 4:
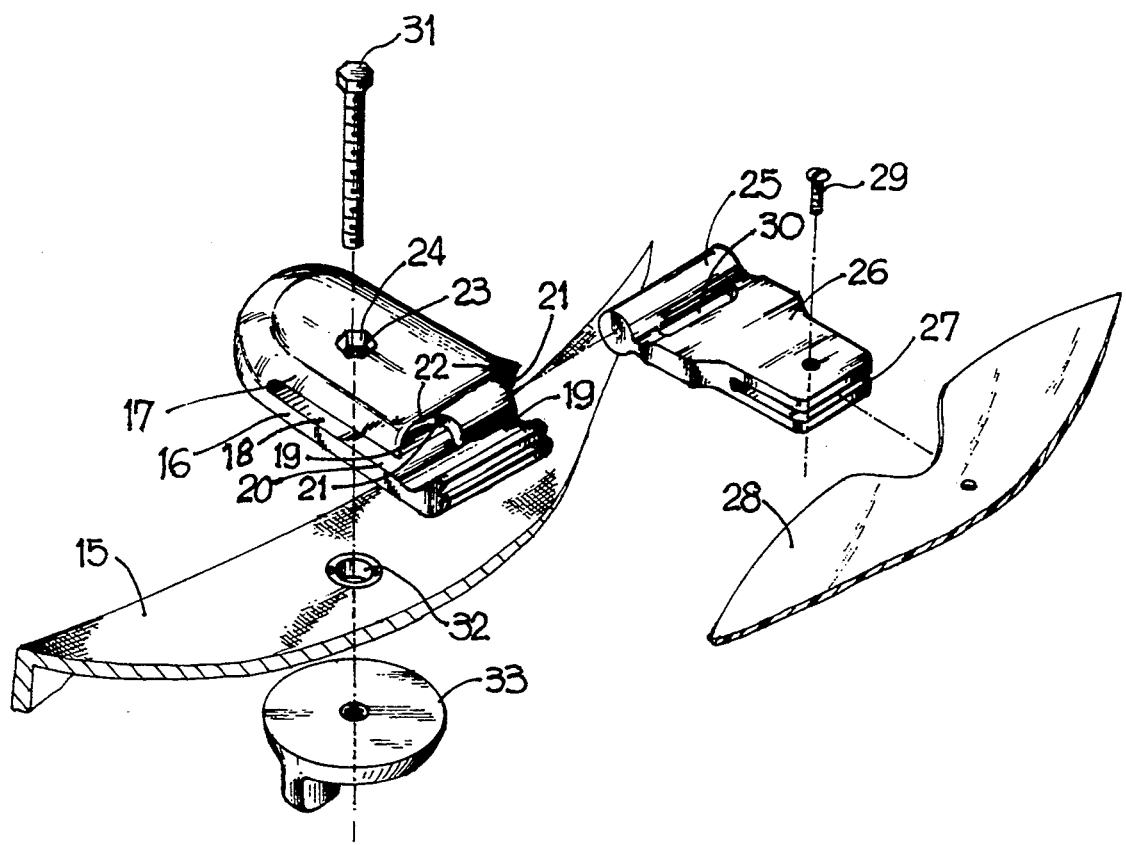
In FIG. 4, each of these arms is provided with a transverse groove 19 at the inward front end portion thereof. These grooves cooperatively complement each other in a manner that thaw define an adjustable split-sided knuckles 20. The lower arm 17 has its grooved front end portion being roundly arcuated in a cylindrical manner and reduced in length to define angular notches 21 and a pair of shoulders 22 serving as stopper for the angular movement of the holder 13 in an operative position "O" as shown in FIG. 3. Centrally of the base 12, a pair of telescopically disposed apertures 23 is provided in a manner that the one at the lower arm 17 has a hexagonal-shaped counterbore 24 downwardly thereof.

Removably fitted into the knuckle 20 of the mounting base 12 is the holder 13 inserted in a manner that the latter's integrally formed pin-like rear end portion 25 is accomodated into the grooves 19 as shown in FIGS. 3 and 4. In assembly, the holder, while being hingedly held in the arms 16 and 17 is capable of rotating as shown by arrow "R" at its pivot for at least about a 90-degree angular displacement from its operative position "O" and outwardly to its inoperative position "I" where the eyeshield is parallelly placed adjacent to the visor as clearly shown in phantom in FIG. 3. The holder 13 has a generally planar main body 26 that is provided with a narrow channel 27 forwardly thereof to facilitate insertion of an eyeshield 28 thereinto and secured with a holding fastener 29 such as screw, rivet, etc. At the inward longitudinal side of the pin-like rear end portion 25, there is provided a longitudinal slot 30. The slot accomodates the passage of the arcuated front end portion of the lower arm 17 permitting the holder 13 to attain its maximum displacement limited by the shoulders 22 as shown in FIG. 3. The pin-like rear end portion 25 of the holder and the corresponding grooves 19 may adapt any cross-sectional shapes such as circular, hexagonal, or any polygonal shape preferred and have their surfaces knurled for better frictional contact.

Figure 1:
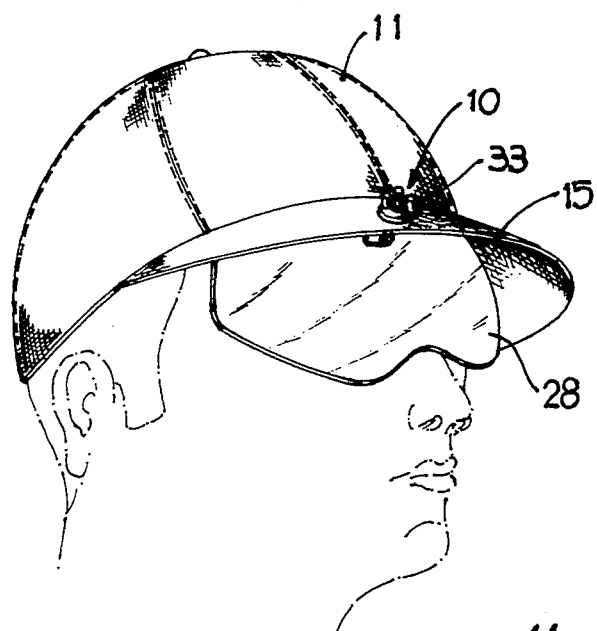
Figure 2:
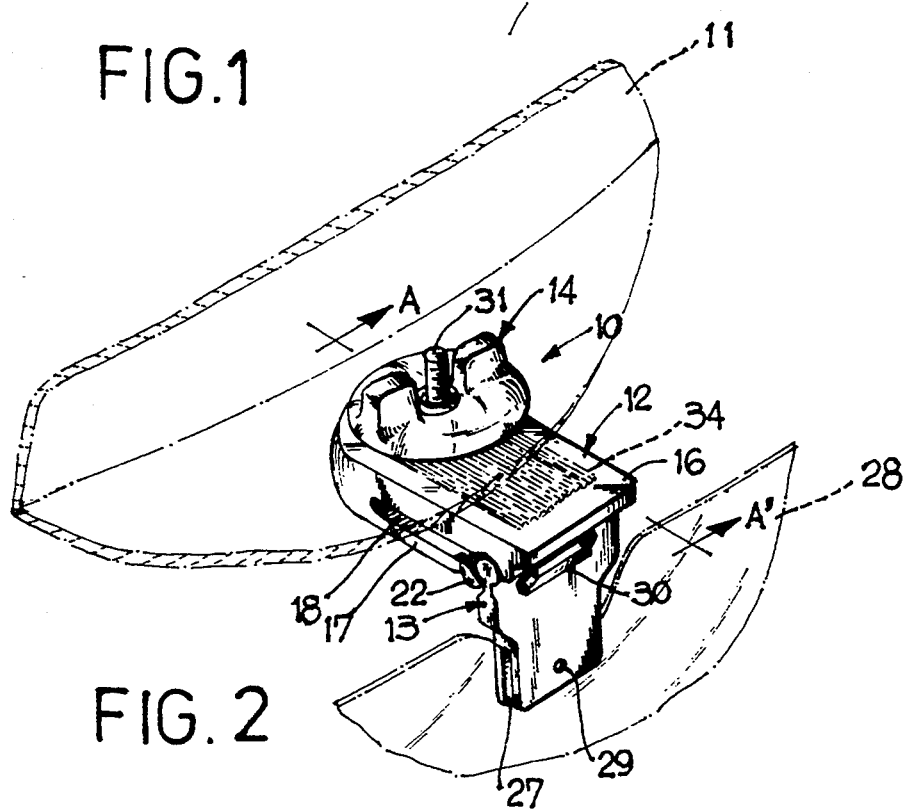
As shown in FIGS. 2 and 3, the mounting base 12 is removably attached at the underside rear portion of a cap visor 15 or hat brim (not shown). This base 12 consist of a pair of flexible upper and lower clipping arms designated by reference numerals 16 and 17, respectively. The arms in their normal condition are separated by a space gap 18 in between them so that both are capable off being defflected towards each other.

In the preferred embodiment shown in FIGS. 2 to 4 the adjustable actuating means 14 for flexedly tightening or loosening both arms 16 and 17 is in the form of bolt-and-nut combination. Into the hexagonal counterbore 24, a hexagonal head of a bolt 31 is fixedly secured in a direction that the other end of the bolt slidably pierces through the apertures 23 provided at the arms 16 and 17. For attachment purposes of the mounting base 12, a hole 32 is provided at the rear central portion of the cap visor 15 to facilitate the entry of the exposed end of the bolt 31 when the upper surface of the upper arm is in contact with the underside surface of the visor 15 in assembly. This set-up is shown in FIG. 3. The exposed end of the bolt at the top side surface of the visor cap engages with a wing nut 33 which, when tightened or loosened, effects a controllable gripping and locking action to the holder 13. When the wing nut is slightly loosened by turning it counterclockwise, the holder is relieved of the gripping pressure of the arms since the lower arm moves outwardly toward its normal position "N" as shown in phantom in FIG. 3, thus making the holder and the eyeshield 28 easy to adjust to any desired inclination. After the desired inclination is attained, the wing nut is tightened again by turning it clockwise and the lower arm moves inwardly upward applying an increased gripping pressure to the holder's pin-like rear end portion 25 resulting to a temporary locking action.

FIG. 2 shows a knurled top surface 3 of the upper arm 16 for a better frictional contact with the underside of the cap visor 15.

Figure 5:
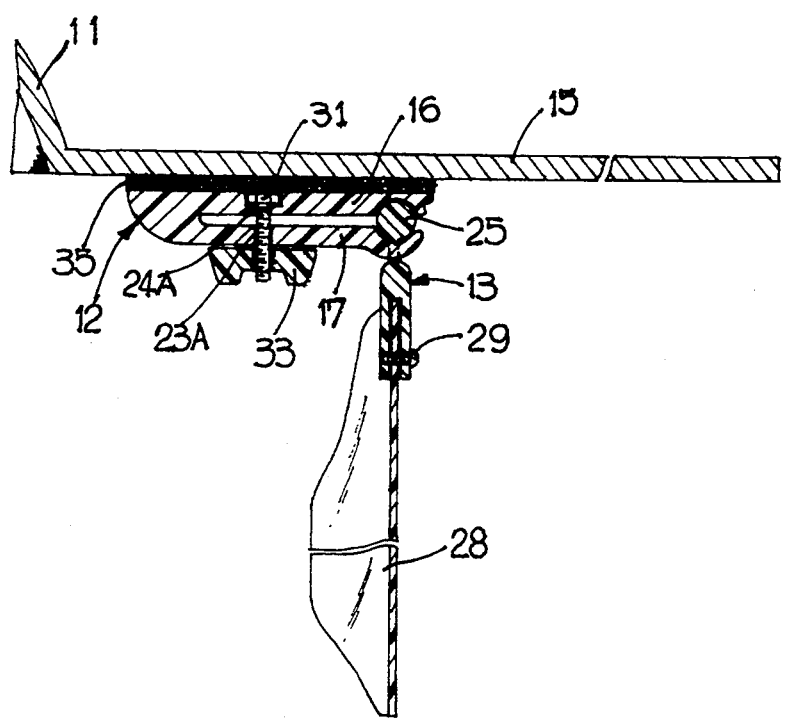

In FIG. 5, there is shown an alternative embodiment of this intention showing another way of attaching the mounting base 12 to the cap visor's underside portion and a different form of clipping arm actuating means. In this embodiment, the mounting base is removably attached to the underside rear portion of the cap visor 15 by a hook and loop fastening tape 35 as shown in FIG. 5. This has an inherent advantage in that there is no need to punch a hole into the visor. The actuating means is still in the form of a bolt-and-nut combination but this time it is downwardly directed. The head of a bolt 31 is fixed to a corresponding counterebored recess 24A at the upper arm, and the bolt body is slidably fitted through an opening 23A at the lower arm such that the exposed end of the bolt is extending from the bottom surface of the lower arm. This exposed bolt end engages with a wing nut 33 for affecting a tightening and loosening action with respect to the gripping pressure or locking action applied by the arms to the holder.

Although there have been described what are at present considered to be the preferred embodiments of the invention, it will be understood that the invention may be embodied in other specific forms without departing from the spirit, essential characteristics or teaching thereof. The present embodiments are therefore to be considered in all aspects as illustrative, and not restrictive. The scope of the invention is indicated by the appended claims rather than by the foregoing description.

I claim:

1. A detachable eyeshield attachment in combination with a visor cap, comprising:

a clip-type mounting base consisting of a pair of flexible upper and lower clipping arms normally separated by a space gap therebetween, said arms having at the respective inward front end portions thereof transversely oriented complementing grooves which are cooperating with each other in a manner that they define an adjustable, split-sided knuckle, wherein said mounting base is removably attached to the underside portion of a cap visor by a bolt-and-nut combination in which the head of the bolt is fixedly secured at the lower arm and upwardly piercing slidably through respective holes provided at the upper arm and visor so that the exposed end of said bolt engages with a wing nut at the top side of said visor whereby actuating said wing nut to abut or move away from the top side surface of the visor effects, respectively, a tightening or loosening of the gripping or locking hold of said arms over said holder, a pivotable eyeshield holder with an eyeshield fixedly secured thereto, said holder having an integrally formed pin-like rear end portion being removably and hingedly held in said arms through the grooves thereof such that said holder is capable of rotating at its pivot for at least about a ninety degree angular displacement from its operative position and outwardly to its inoperative position.

2. A detachable eyeshield attachment in combination with a visor cap as claimed in claim 1 wherein the top surface of said upper arm in contact with the visor is knurled for a better frictional contact therebetween.

3. A detachable eyeshield attachment in combination with a visor cap as claimed in claim 1 wherein said eyeshield holder is provided with a longitudinal slot at the inward side of said pin-like rear end portion thereof, said slot accommodating the passage of an arcuated and reduced end portion of said lower arm where said groove is disposed to permit said holder to attain its operative position, said pin-like rear end portion and said complementing grooves of said arms having a rounded cross-section.

4. A detachable eyeshield attachment in combination with a visor cap as claimed in claim 2 wherein said eyeshield holder is provided with a longitudinal slot at the inward side of said pin-like rear end portion thereof, said slot accommodating the passage of an arcuated and reduced end portion of said lower arm where said groove is disposed to permit said holder to attain its operative position, said pin-like rear end portion and said complementing grooves of said arms having a rounded cross-section.

* * * * *

UNITED STATES PATENT AND TRADEMARK OFFICE
CERTIFICATE OF CORRECTION

PATENT NO. : 5,412,812
DATED : May 9, 1995
INVENTOR(S) : Bayani V. Gatchalian

It is certified that error appears in the above-indentified patent and that said Letters Patent is hereby corrected as shown below:

"Col.1, line 12, change 'ewe' to - eye -."

"Col,1, line 19, change 'types' to - type -." (2nd occurrence)

"Col.1, line 22, change 'thaw' to - they -."

"Col.3, line 38, change 'off' to - of -."

"Col.3, line 38, change 'defflected' to - deflected -."

"Col.3, line 42, change 'thaw' to - they -."

"Col 4, line 5, change 'Fig. 3' to - Fig. 2-."

"Col 4, l:line 39, change 'surface 3' to - surface 34-."

Title page, item [57] line 2 of Abstract, change 'For' to - for-."

Signed and Sealed this

Eleventh Day of July, 1995

Attest:

BRUCE LEHMAN

Attesting Officer

Commissioner of Patents and Trademarks